(12) United States Patent
Dettinger et al.

(10) Patent No.: US 7,698,265 B2
(45) Date of Patent: Apr. 13, 2010

(54) FINDING ANOMALOUS VALUES FOR LOGICAL FIELDS WITH TEMPORAL AUTOCORRELATION CONDITIONS

(75) Inventors: Richard Dean Dettinger, Rochester, MN (US); Frederick Allyn Kulack, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 11/853,545

(22) Filed: Sep. 11, 2007

(65) Prior Publication Data

US 2009/0070307 A1    Mar. 12, 2009

(51) Int. Cl.
    *G06F 7/00* (2006.01)
(52) U.S. Cl. .......................................................... 707/4
(58) Field of Classification Search ................. 707/3–5; 715/764; 434/118, 323; 706/46
    See application file for complete search history.

(56) References Cited

U.S. PATENT DOCUMENTS

| 7,003,730 | B2* | 2/2006 | Dettinger et al. ............. 715/764 |
| 2005/0118557 | A1* | 6/2005 | Sumner et al. ............... 434/118 |
| 2005/0289092 | A1* | 12/2005 | Sumner et al. ................ 706/46 |
| 2006/0294065 | A1* | 12/2006 | Dettinger et al. ............... 707/3 |

* cited by examiner

*Primary Examiner*—Hung T Vy
(74) *Attorney, Agent, or Firm*—Patterson & Sheridan, LLP

(57) ABSTRACT

Embodiments of the invention provide a technique for finding anomalous values for fields with temporal autocorrelation, without resorting to complex query writing. When composing an abstract query a query interface may be provided for a user to input a temporal correlation conditions. The temporal correlation conditions may include a type of change, a delta value, and a time frame within which two data values must occur to be identified as an anomalous value. The time correlation conditions are then passed to a query builder configured to generate and execute a database query configured to identify anomalous values based on the time correlation conditions.

21 Claims, 8 Drawing Sheets

Query Definition

| Database | Search Database | Query Conditions | Query Output | New Condition — 404 |

Field: Hemoglobin

Build a time correlation condition [v]

Field:

Hemoglobin [Changes v]    by  Amount: [10]   [% v]  over  [3]   Time Interval  [Years v] — 402
         Changes                          %                                    Days
[Add Event]  Increases                    Units                                Weeks
             Decreases                    410         412                      Months
                                                                               Years
                        408

Advanced Condition Options

[✓] Apply condition to all records for each entity...
[ ] Apply condition to a new incident of this field.

[Create]   [Cancel]

FIG. 4

```xml
<Field name="Hemoglobin" multiSelect="Yes" rangeCapable="Yes" existMethod="NotNull">
  <AccessMethod>
    <Composed>
      <Composition><FieldRef name="data://Internal/TestValue" /></Composition>
      <Where>
        <Condition field="data://Internal/TestType" operator="EQ">
          <Value val="20570-8">
          </Value>
        </Condition>
      </Where>
    </Composed>
  </AccessMethod>
  <Type baseType="float">
    <Range minValue="0.0" maxValue="100000.0" />
  </Type>
  <Attribute name="Test Time" type="EventCondition"
      autoCorrelate="true" autoCorrelationUnits="Days,Weeks,Months,Years" >
    <FieldRef name="data://Internal/TimeOfTest" />
  </Attribute>
</Field>
```

FIG. 5

FINDING ANOMALOUS VALUES FOR LOGICAL FIELDS WITH TEMPORAL AUTOCORRELATION CONDITIONS

BACKGROUND OF THE INVENTION

1. Field of the Invention

Embodiments of the invention generally relate to computer database systems. More particularly, the invention relates to techniques for finding anomalous values for fields with temporal autocorrelation.

2. Description of the Related Art

Databases are well known systems for storing, searching, and retrieving information stored in a computer. The most prevalent type of database used today is the relational database, which stores data using a set of tables that may be reorganized and accessed in a number of different ways. Users access information in relational databases using a relational database management system (DBMS).

Each table in a relational database includes a set of one or more columns. Each column typically specifies a name and a data type (e.g., integer, float, string, etc), and may be used to store a common element of data. For example, in a table storing data about patients treated at a hospital, each patient might be referenced using a patient identification number stored in a "patient ID" column. Reading across the rows of such a table would provide data about a particular patient. Tables that share at least one attribute in common are said to be "related." Further, tables without a common attribute may be related through other tables that do share common attributes. A path between two tables is often referred to as a "join," and columns from tables related through a join may be combined to from a new table returned as a set of query results.

Queries of a relational database may specify which columns to retrieve data from, how to join the columns together, and conditions (predicates) that must be satisfied for a particular data item to be included in a query result table. Current relational databases require that queries be composed in complex query languages. Today, the most widely used query language is Structured Query Language (SQL). However, other query languages are also used. An SQL query is composed from one or more clauses set off by a keyword. Well-known SQL keywords include the SELECT, WHERE, FROM, HAVING, ORDER BY, and GROUP BY keywords. Composing a proper SQL query requires that a user understand both the structure and content of the relational database as well as the complex syntax of the SQL query language (or other query language).

The complexity of constructing an SQL statement, however, generally makes it difficult for average users to compose queries of a relational database. In medical research, there are often times when a user would like to analyze changes in data values over a certain time window. The researcher may wish to find data that can be classified as having a "temporal autocorrelation" characteristic, that is, if two measurements of a value occur close in time, then the values of those measurements are often very similar.

SUMMARY OF THE INVENTION

Embodiments of the invention generally provide techniques for finding anomalous values for logical fields of a database abstraction model using temporal autocorrelation, without resorting to complex query writing.

One embodiment of the invention includes a method of finding anomalous values for data from a database by using a temporal autocorrelation condition. The method generally includes receiving an abstract query composed from a plurality of logical fields, where a first logical field in the abstract query includes a temporal autocorrelation condition, The temporal autocorrelation condition may specify a type of change two data values retrieved for the first logical field should exhibit to be identified as an anomalous value, a delta value specifying how much two data values retrieved for the first logical field should differ from one another to be identified as an anomalous value, and a time frame within which two data values should occur to be identified as an anomalous value. The method may also include generating a resolved query of the database using the temporal autocorrelation condition, executing the resolved query to retrieve a set of query results, and returning query results to a user. The query results include an indication of any anomalous values identified based on the temporal autocorrelation condition for the first logical field.

Another embodiment of the invention includes a computer-readable storage medium containing a program which, when executed, performs an operation of finding anomalous values for data from a database by using a temporal autocorrelation condition. The operation may generally include receiving an abstract query composed from a plurality of logical fields, where a first logical field in the abstract query includes a temporal autocorrelation condition. The temporal autocorrelation condition may specify a type of change two data values retrieved for the first logical field should exhibit to be identified as an anomalous value, a delta value specifying how much two data values retrieved for the first logical field should differ from one another to be identified as an anomalous value, and a time frame within which two data values should occur to be identified as an anomalous value. The operation may also include generating a resolved query of the database using the temporal autocorrelation condition, executing the resolved query to retrieve a set of query results, and returning query results to a user. The query results include an indication of any anomalous values identified based on the temporal autocorrelation condition for the first logical field.

Still another embodiment of the invention includes a system having a processor and a memory containing a program, which when executed on the processor is configured to identify anomalous values for data from a database by using a temporal autocorrelation condition. The program may be configured to perform the steps of receiving an abstract query composed from a plurality of logical fields, where a first logical field in the abstract query includes a temporal autocorrelation condition. A type of change two data values retrieved for the first logical field must exhibit to be identified as an anomalous value. The temporal autocorrelation condition may specify a type of change two data values retrieved for the first logical field should exhibit to be identified as an anomalous value, a delta value specifying how much two data values retrieved for the first logical field should differ from one another to be identified as an anomalous value, and a time frame within which two data values should occur to be identified as an anomalous value. The steps may also include generating a resolved query of the database using the temporal autocorrelation condition, executing the resolved query to retrieve a set of query results, and returning query results to a user. The query results include an indication of any anomalous values identified based on the temporal autocorrelation condition for the first logical field.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 4 illustrates an example query interface used to build a query to identify anomalous values using temporal autocorrelation, according to one embodiment of the invention.

FIG. 5 illustrates an example of an abstract field definition for a field with temporally correlated data, according to one embodiment of the invention.

DETAILED DESCRIPTION OF THE PREFERRED EMBODIMENTS

Figure 1:
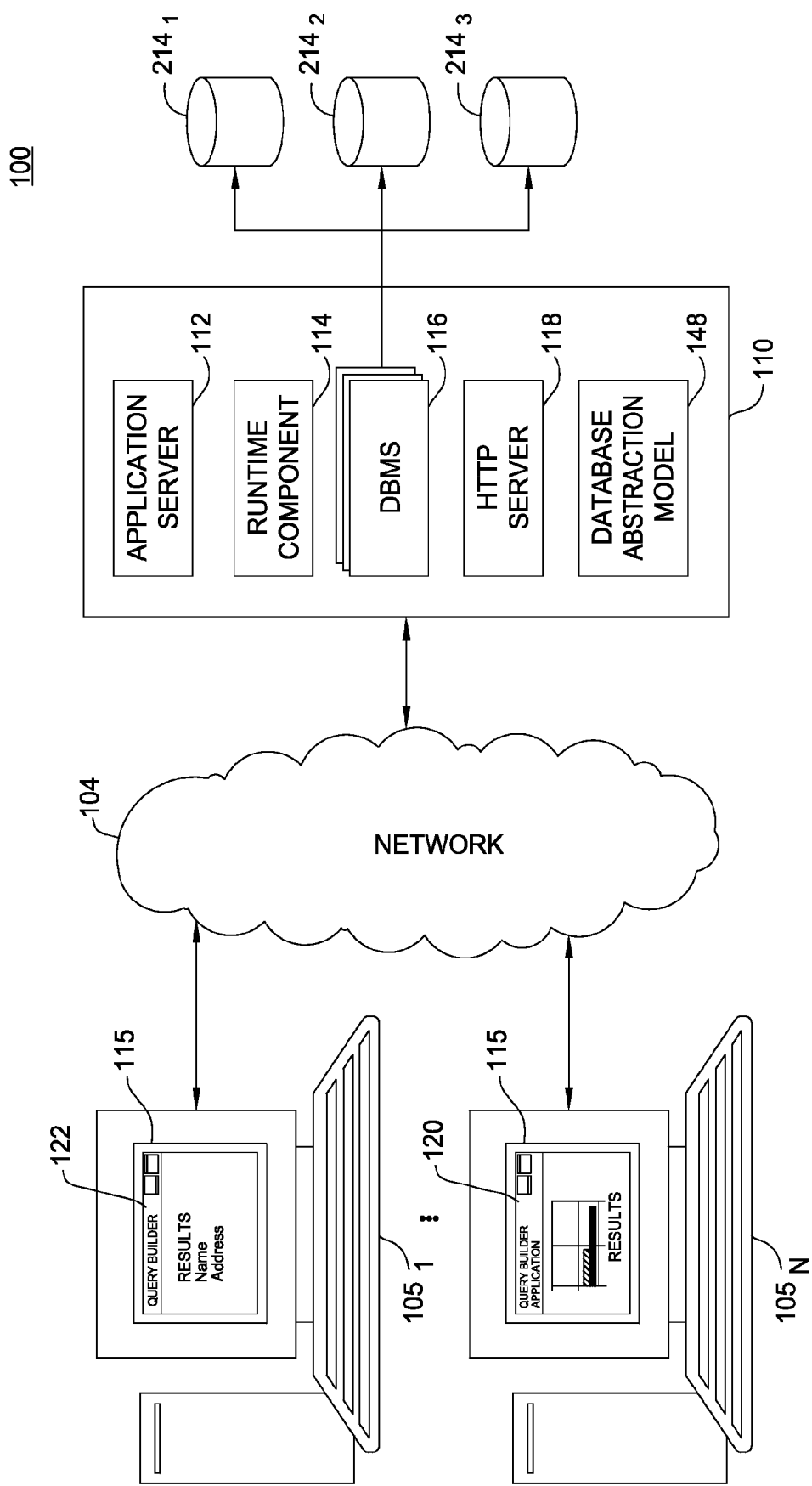
FIG. 1 illustrates a network environment using a client-server configuration, according to one embodiment of the invention.

Embodiments of the invention provide a convenient way for users to identify anomalous autocorrelation data, without the need to spend substantial time to write complicated queries or become proficient in complex query languages. Because of the complexity of such query languages, users often turn to database query applications to assist them in composing queries of a database. One technique for managing the complexity of a relational database, and the SQL query language, is to use database abstraction techniques. Commonly assigned U.S. patent application Ser. No. 10/083,075 (the '075 application) entitled "Application Portability and Extensibility through Database Schema and Query Abstraction," discloses techniques for constructing a database abstraction model over an underlying physical database.

The '075 application discloses embodiments of a database abstraction model constructed from logical fields that map to data stored in the underlying physical database. Each logical field defines an access method that specifies a location (i.e., a table and column) in the underlying database from which to retrieve data. Users compose an abstract query by selecting logical fields and specifying conditions. The operators available for composing conditions in an abstract query generally include the same operators available in SQL (e.g., comparison operators such as =, >, <, >=, and, <=, and logical operators such as AND, OR, and NOT). Data is retrieved from the physical database by generating a resolved query (e.g., an SQL statement) from the abstract query. Because the database abstraction model is tied to neither the syntax nor the semantics of the physical database, additional capabilities may be provided by the database abstraction model without having to modify the underlying database. Thus, the database abstraction model provides a platform for additional enhancements that allow users to compose meaningful queries easily, without having to disturb existing database installations.

In one embodiment, the data definition provided in a logical field may be extended to include metadata related to temporal autocorrelation. That is, metadata may specify that data associated with the field may be temporally correlated, and also specify time units for which the field may be temporally auto correlated. A query interface exposing the data abstraction model to a user may be configured to display relevant options for correlation conditions. A user may specify the correlation conditions used by a query builder to generate sub-tables used to identify data values that match the correlation conditions. For example, the results of a test reflecting a patient's hemoglobin level should be similar if another test is taken a short time later. A medical researcher may wish to identify abnormal changes in such values, because sudden changes may be interesting to research. Thus, a researcher may wish to identify all patients who have had more than a 10% change in hemoglobin levels within a three week time window. To do this, the researcher must compose queries to search on the value and its type, the change between two or more values, and the time frame used to measure the change. Constructing queries to correctly identify this list of patients can be difficult, time-consuming, and prone to error, particularly for users who lack sophistication in the syntax and semantics of database query languages.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable media. Illustrative computer-readable media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Other media include communications media through which information is conveyed to a computer, such as through a computer or telephone network, including wireless communications networks. The latter embodiment specifically includes transmitting information to/from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates a network environment 100 using a client-server configuration, according to one embodiment of the invention. Client computer systems 1051-N include an interface that enables network communications with other systems over network 104. The network 104 may be a local area network where both the client system 105 and server system 110 reside in the same general location, or may be network connections between geographically distributed systems, including network connections over the internet. Client system 105 generally includes a central processing unit (CPU) connected by a bus to memory and storage (not shown). Each client system 105 is typically running an operating system configured to manage interaction between the computer hardware and the higher-level software applications running on the client system 105 (e.g., a Linux® distribution, a version of the Microsoft Windows® operating system IBM's AIX® or OS/400®, FreeBSD, and the like). ("Linux" is a registered trademark of Linus Torvalds in the United States and other countries.)

The server system 110 may include hardware components similar to those used by the client system 105. Accordingly, the server system 110 generally includes a CPU, a memory, and a storage device, coupled by a bus (not shown). The server system 110 is also running an operating system, (e.g., a Linux® distribution, Microsoft Windows®, IBM's OS/400® or AIX®, FreeBSD, and the like).

The network environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

In one embodiment, users interact with the server system 110 using a graphical user interface (GUI) provided by a user interface 115. In a particular embodiment, GUI content may comprise HTML documents (i.e., web-pages) rendered on a client computer system 1051 using web-browser 122. In such an embodiment, the server system 110 includes a Hypertext Transfer Protocol (HTTP) server 118 (e.g., a web server such as the open source Apache web-server program or IBM's Web Sphere® program) configured to respond to HTTP requests from the client system 105 and to transmit HTML documents to client system 105. The web-pages themselves may be static documents stored on server system 110 or generated dynamically using application server 112 interacting with web-server 118 to service HTTP requests. Alternatively, client application 120 may comprise a database front-end, or query application program running on client system $105_N$. The web-browser 122 and application 120 may be configured to allow a user to compose an abstract query, and to submit the query to the runtime component 114 for processing.

As illustrated in FIG. 1, server system 110 may further include runtime component 114, database management system (DBMS) 116, and database abstraction model 148. In one embodiment, these components may be provided using software applications executing on the server system 110. The DBMS 116 includes a software application configured to manage databases $214_{1-3}$. That is, the DBMS 116 communicates with the underlying physical database system, and manages the physical database environment behind the database abstraction model 148. Users interact with the user interface 115 to compose and submit an abstract query to the runtime component 114 for processing.

In one embodiment, the runtime component 114 may be configured to receive an abstract query, and in response, to generate a "resolved" or "concrete" query that corresponds to the schema of underlying physical databases 214. For example, the runtime component 114 may be configured to generate one or more Structured Query Language (SQL) statements from an abstract query. The resolved queries generated by the runtime component 114 are supplied to DBMS 116 for execution. Additionally, the runtime component 114 may be configured to modify the resolved query with additional restrictions or conditions, based on the focus of the abstract query, i.e., based on the model entity specified for a given query.

Figure 2A:
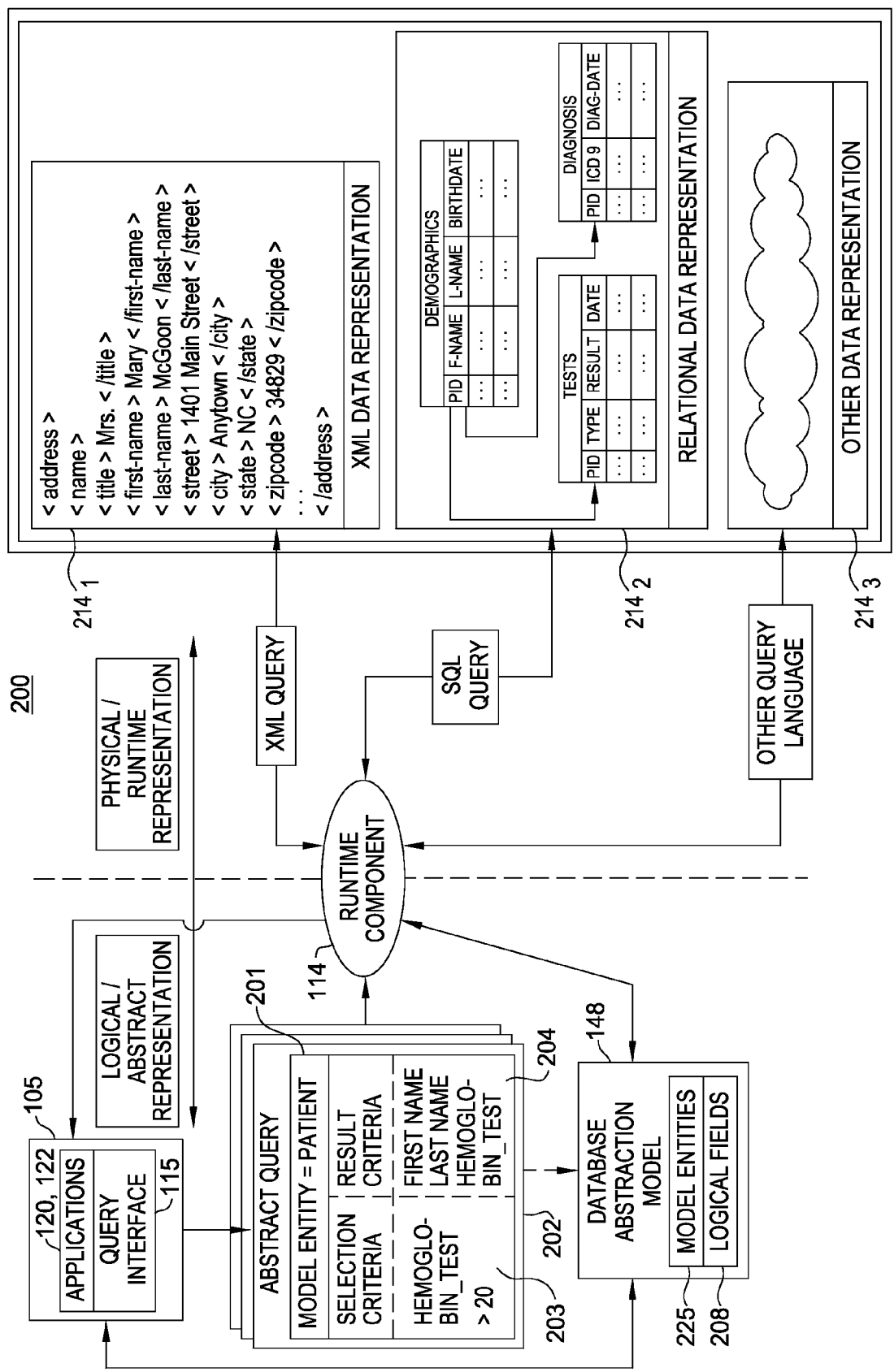
FIGS. 2A and 2B illustrate a logical view of a database abstraction model constructed over an underlying physical database, according to one embodiment of the invention.

FIG. 2A illustrates a plurality of interrelated components of the invention, along with relationships between the logical view of data provided by the database abstraction model environment (the left side of FIG. 2A), and the underlying physical database environment used to store the data (the right side of FIG. 2A).

In one embodiment, the database abstraction model 148 provides definitions for a set of logical fields 208 and model entities 225. Users compose an abstract query 202 by specifying logical fields 208 to include in selection criteria 203 and results criteria 204. An abstract query 202 may also identify a model entity 201 from the set of model entities 225. The resulting query is generally referred to herein as an "abstract query" because it is composed using logical fields 208 rather than direct references to data structures in the underlying physical databases 214. The model entity 225 may be used to indicate a logical focus of the abstract query 202 (e.g., a query focused on a "patient", a "person", an "employee", a "test", a "facility" etc). Illustratively, abstract query 202 includes an indication that query 202 is directed to instances of a "patient" model entity 201, and further includes selection criteria 203 indicating that patients with a "hemoglobin_test >20" should be retrieved. The selection criteria 203 are composed by specifying a condition evaluated against the data values corresponding to a logical field 208 (in this case the "hemoglobin_test" logical field. The operators in a condition typically include comparison operators such as =, >, <, >=, or, <=, and logical operators such as AND, OR, and NOT. Results criteria 204 indicates that data retrieved for this abstract query 202 includes data for the "name," "age," and "hemoglobin_test" logical fields 208.

As stated, in one embodiment, an abstract query may specify a type of model entity being queried (e.g., a patient, an employee or a test). The model entity defines a logical focus, or central concept, for an abstract query. Thus, rather than compose a query data based on the structure of an underlying database (e.g., an SQL schema), users compose a query about a model entity (e.g., about a patient) by specifying which logical fields should be used to evaluate whether a given instance of the model entity (i.e., data related to a particular patient) should be included in the query results. Doing so allows users to compose complex queries in a straightforward and intuitive manner. The use of model entities to provide a focus for abstract queries is described in commonly assigned U.S. Pat. No. 7,054,877 (the '877 patent) entitled "Dealing with Composite Data through Data Model Entities," incorporated herein by reference in its entirety.

In one embodiment, runtime component 114 (also referred to as a query builder) may be configured to retrieve data from physical database 214 by generating a resolved query (e.g., an SQL statement) from abstract query 202. Because database abstraction model 148 is not tied to either the schema of physical database 214 or the syntax of a particular query language, additional capabilities may be provided by database abstraction model 148 without having to modify the underlying database. Further, depending on the access method specified for a logical field, runtime component 114 may transform abstract query 202 into an XML query that queries data from database $214_1$, an SQL query of relational database $214_2$, or other query composed according to another physical storage mechanism using other data representation $214_3$, or combinations thereof (whether currently known or later developed).

Figure 2B:
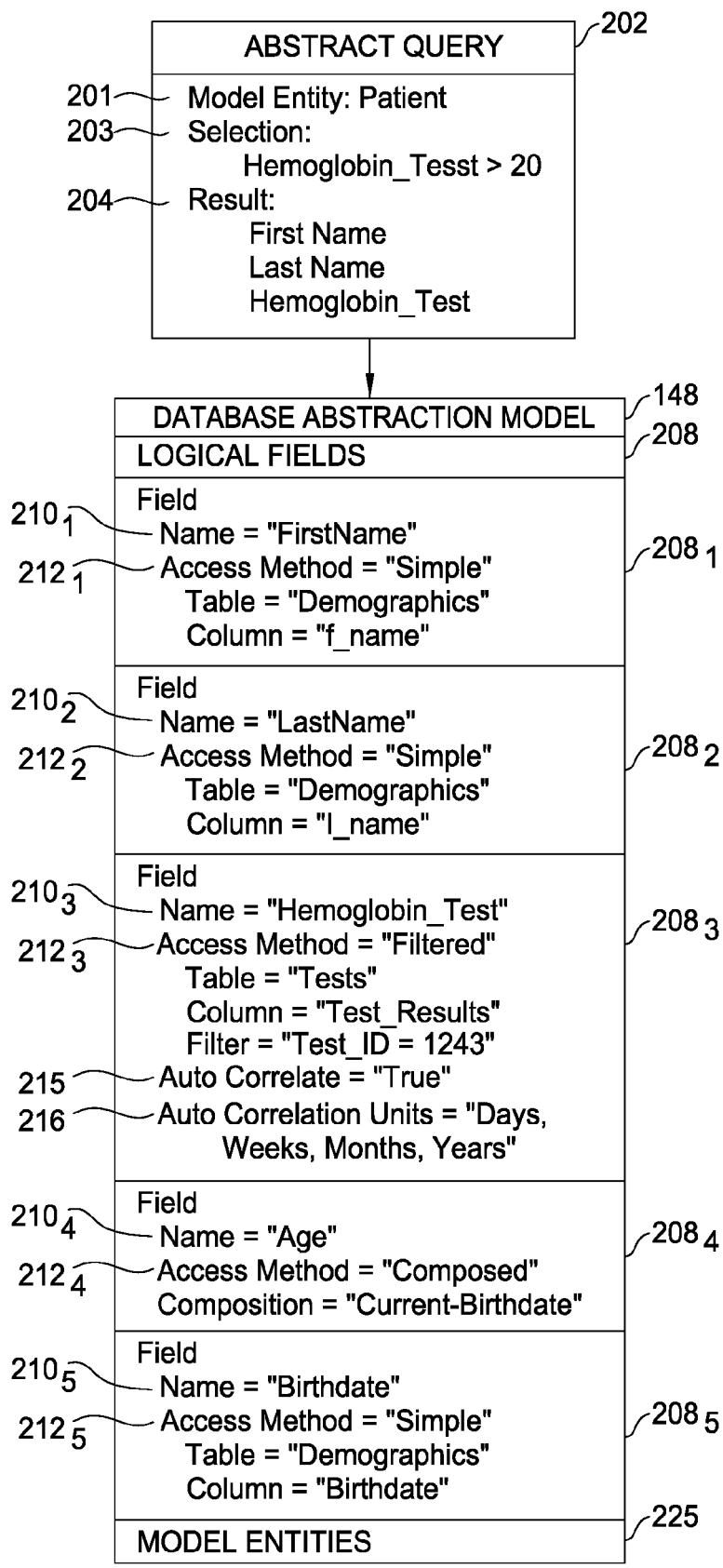

FIG. 2B illustrates an exemplary abstract query 202, relative to the database abstraction model 148, according to one embodiment of the invention. As shown in FIG. 2B, abstract query 202 includes selection criteria 203 indicating that the query should retrieve instances of the patient model entity 201 with a "hemoglobin" test value greater than "20." The particular information retrieved using abstract query 202 is specified by result criteria 204. In this example, the abstract query 202 retrieves a patient's name and a test result value for a hemoglobin test. The actual data retrieved may include data from multiple tests. That is, the query results may exhibit a one-to-many relationship between a particular model entity and the query results.

An illustrative abstract query corresponding to abstract query 202 is shown in Table I below. In this example, the abstract query 202 is represented using extensible markup language (XML). In one embodiment, query interface 115 may be configured to enable a user to compose an abstract query, and to generate an XML document to represent the finished abstract query. Those skilled in the art will recognize that XML is a well known markup language used to facilitate the sharing of structured text and information. Of course, other markup languages may be used.

TABLE I

| Query Example |
|---|
| 001 <?xml version="1.0"?> |
| 002 <!--Query string representation: ("Hemoglobin_test > 20") |
| 003 <QueryAbstraction> |

TABLE I-continued

| Query Example |
|---|
| 004   <Selection> |
| 005     <Condition> |
| 006       <Condition field="Hemoglobin Test" operator="GT" value="20" |
| 007     </Condition> |
| 008   </Selection> |
| 009   <Results> |
| 010     <Field name="FirstName"/> |
| 011     <Field name="LastName"/> |
| 012     <Field name="hemoglobin_test"/> |
| 013   </Results> |
| 014   <Entity name="Patient" > |
| 015     <FieldRef name="data://patient/PID" /> |
| 016     <Usage type="query" /> |
| 017     </EntityField> |
| 018   </Entity> |
| 019 </QueryAbstraction> |

The XML markup shown in Table I includes the selection criteria 203 (lines 004-008) and the results criteria 204 (lines 009-013). Selection criteria 203 includes a field name (for a logical field), a comparison operator (=, >, <, etc) and a value expression (what the field is being compared to). In one embodiment, the results criteria 204 include a set of logical fields for which data should be returned. The actual data returned is consistent with the selection criteria 203. Lines 14-18 identify the model entity selected by a user, in this example, a "Patient" model entity. Thus, the query results returned for abstract query 202 are instances of the "Patient" model entity and data for the results criteria specified in the query (lines 009-013). Line 15 indicates the identifier in the physical database 214 used to identify instances of the model entity. In this case, instances of the "Patient" model entity are identified using values from the "Patient ID" column of a patient table.

After composing an abstract query, a user may submit it to runtime component 114 for processing. In one embodiment, runtime component 114 may be configured to process abstract query 202 by generating an intermediate representation of abstract query 202, such as an abstract query plan. In one embodiment, an abstract query plan is composed from a combination of abstract elements from the data abstraction model and physical elements relating to the underlying physical database. For example, an abstract query plan may identify which relational tables and columns are referenced by which logical fields included in abstract query 202, and further identify how to join columns of data together. Runtime component 114 may then parse the intermediate representation in order to generate a physical query of the underlying physical database (e.g., an SQL statement(s)). Abstract query plans and query processing are further described in a commonly assigned, co-pending application entitled "Abstract Query Plan," Ser. No. 11/005,418, filed Dec. 6, 2004, which is incorporated by reference herein in its entirety.

FIG. 2B further illustrates an embodiment of a database abstraction model 148 that includes a plurality of logical field specifications $208_{1-5}$ (five shown by way of example). The access methods included in logical field specifications 208 (or logical field, for short) are used to map the logical fields 208 to tables and columns in an underlying relational database (e.g., database $214_2$ shown in FIG. 2A). As illustrated, each field specification 208 identifies a logical field name $210_{1-5}$ and an associated access method $212_{1-5}$. Depending upon the different types of logical fields, any number of access methods may be supported by database abstraction model 148.

FIG. 2B illustrates access methods for simple fields, filtered fields, and composed fields. Each of these three access methods are described below.

A simple access method specifies a direct mapping to a particular entity in the underlying physical database. Field specifications $208_1$, $208_2$, and $208_5$ each provide a simple access method, $212_1$, $212_2$, and $212_5$, respectively. For a relational database, the simple access method maps a logical field to a specific database table and column. For example, the simple field access method $212_1$ shown in FIG. 2B maps the logical field name $210_1$ "FirstName" to a column named "f_name" in a table named "Demographics."

Logical field specification $208_3$ exemplifies a filtered field access method $212_3$. Filtered access methods identify an associated physical database and provide rules defining a particular subset of items within the underlying database that should be returned for the filtered field. Consider, for example, a relational table storing test results for a plurality of different medical tests. Logical fields corresponding to each different test may be defined, and a filter for each different test is used to associate a specific test with a logical field. For example, logical field $208_3$ illustrates a hypothetical "Hemoglobin Test." The access method for this filtered field $212_3$ maps to the "Test_Result" column of a "Tests" tests table and defines a filter "Test_ID='1243.'" Only data that satisfies the filter is returned for this logical field. Accordingly, the filtered field $208_3$ returns a subset of data from a larger set, without the user having to know the specifics of how the data is represented in the underlying physical database, or having to specify the selection criteria as part of the query building process.

Additionally, field specification $208_3$ exemplifies a method for identifying the field as one that may include auto-correlated data. As used herein, auto-correlated generally refers to data measurements with an expected relationship when multiple samples are measured closely in time. For example, the results of a particular hemoglobin test may typically be expected to remain about the same when performed on two consecutive days. As shown, an auto-correlate attribute 215 is set to "true" indicating that data values for logical field $208_3$ may be temporally correlated. A "units" attribute 216 indicates what time units may be specified to evaluate data values for logical field $208_3$ to identify anomalous results for auto-correlated data. Illustratively, the time periods available for temporal auto-correlation for logical field $208_3$ may be selected from days, weeks, months, or years. Of course, any arbitrary time period may be specified as appropriate to identify anomalous values in temporally auto-correlated data in a particular case. Auto-correlated data is explained in more detail below.

Field specification $208_4$ exemplifies a composed access method $212_4$. Composed access methods generate a return value by retrieving data from the underlying physical database and performing operations on the data. In this way, information that does not directly exist in the underlying data representation may be computed and provided to a requesting entity. For example, logical field access method $212_4$ illustrates a composed access method that maps the logical field "age" $208_4$ to another logical field $208_5$ named "birthdate." In turn, the logical field "birthdate" $208_5$ maps to a column in a demographics table of relational database $214_2$. In this example, data for the "age" logical field $208_4$ is computed by retrieving data from the underlying database using the "birthdate" logical field $208_5$, and subtracting a current date value from the birth date value to calculate an age value returned for the logical field $208_4$. Another example includes a "name" logical filed (not shown) composed from the first name and last name logical fields $208_1$ and $208_2$.

By way of example, the field specifications 208 shown in FIG. 2B are representative of logical fields mapped to data represented in the relational data representation $214_2$. However, other instances of database abstraction model 148 or, other logical field specifications, may map to other physical data representations (e.g., databases $214_1$ or $214_3$ illustrated in FIG. 2A). Further, in one embodiment, database abstraction model 148 is stored on computer system 110 using an XML document that describes the model entities, logical fields, access methods, and additional metadata that, collectively, define the database abstraction model for a particular physical database system. Other storage mechanisms or markup languages, however, are also contemplated.

Figure 3:
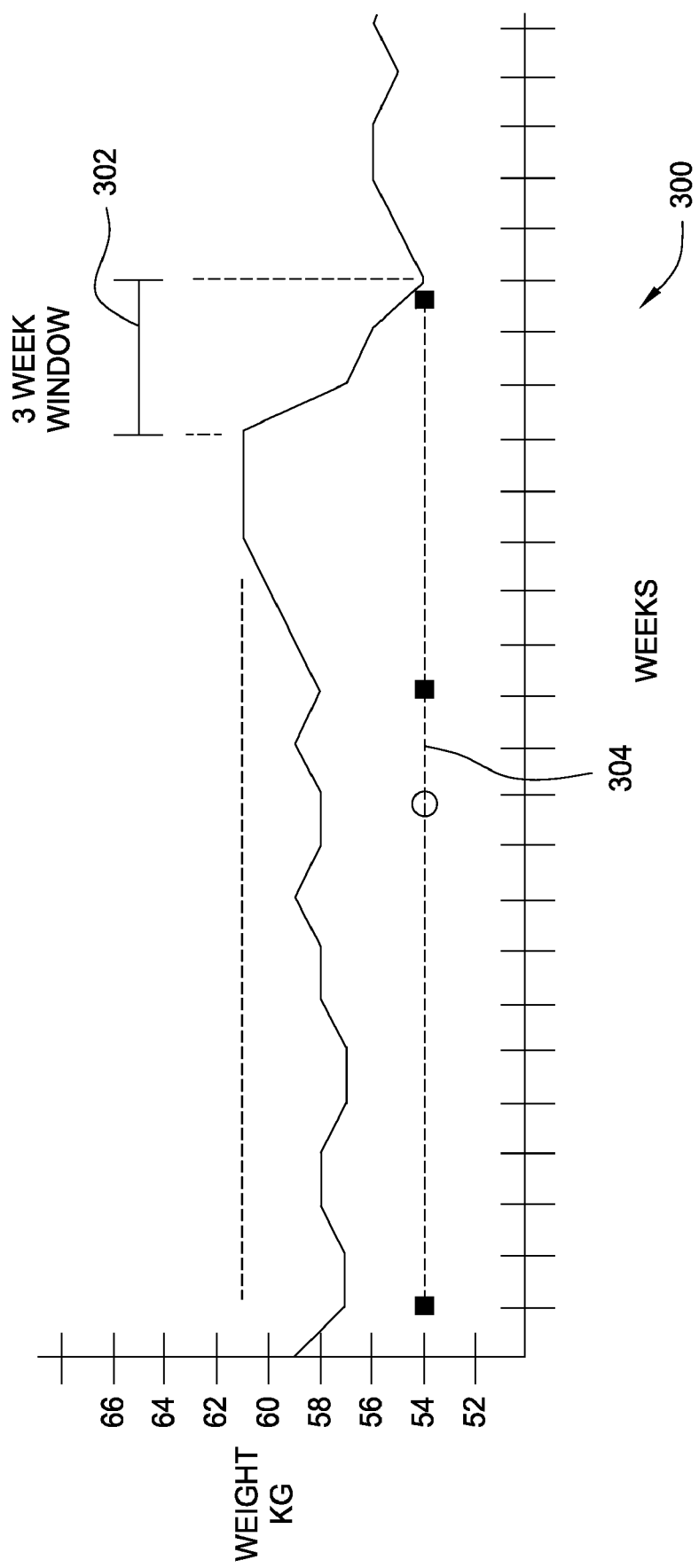
FIG. 3 illustrates a graph of example weight measurements that may be evaluated to identify anomalous values using temporal autocorrelation, according to one embodiment of the invention.

FIG. 3 illustrates an example graph 300 of weight measurements that may be evaluated to identify anomalous values using temporal autocorrelation, according to one embodiment of the invention. In this example, graph 300 represents weight measurements for a patient measured on a weekly basis. As shown, the patient's weight (in Kg) is shown on the Y-axis and the date (in weekly increments) is shown on the X axis. Assume that for a given study, a researcher needs to identify significant weight changes (e.g., >10%) over any three week window. Typically, the timeframe is closely related to the type of measurement and the frequency of measurements. Looking at the data represented in graph 300, it is clear that this patient matches the criteria. In the time window 302, there is an abrupt 11.4% decrease in weight, from 61 kg to 54 kg. This could indicate to the researcher that an unhealthy condition exists. Note, to identify anomalies in temporally auto-correlated data, three factors are considered: (1) the value and its type, (2) the delta between two or more values, and (3) the time frame between the values.

As shown, a "sliding window" 304 indicates a beginning and ending time period in which to evaluate data values from the database; in this example, weight measurements sampled once a week. Conceptually, as the "sliding window" 304 "slides" along the X axis and data within sliding window 304 is evaluated against the correlation condition. However, composing a database query to perform this conceptually straightforward search using conventional query is often very difficult. Accordingly, in one embodiment, a query interface to the database abstraction model is provided that may greatly simplify the query building process, allowing users to efficiently compose queries to identify anomalous values using temporal autocorrelation based on these three factors, without the user having to understand the complexity of a given database query language (e.g., SQL).

FIG. 4 illustrates an example query interface 400 used to build a to identify anomalous values using temporal autocorrelation, according to one embodiment of the invention. Query interface 400 provides an intuitive and simple interface used for building an abstract query to identify anomalous values for temporally correlated data. In this example, a temporal autocorrelation condition is being built for the Hemoglobin logical field. As shown, a "New Condition" tab 404 is selected and query interface 400 displays interface elements used to specify the three relevant factors for identify anomalous values using temporal autocorrelation discussed above. Specifically, a drop-down box 406 is used to specify the type of change to evaluate. In this case, drop-down box 406 is set to "changes." This indicates that any change in the hemoglobin test (that satisfies the other temporal autocorrelation conditions) should be included in query results. Other choices for drop-down box 406 include "increases" and "decreases." Of course, the type of conditions may be tailored to suit the situation in a particular case.

Query interface 400 also includes an "amount" text box 408 and a "units" drop-down box 410. These elements of interface 400 may be used to specify values for the second factor discussed above. That is, to specify the delta between two or more values. In the example shown in FIG. 4, a change of at least 10% is needed before a "change" in two hemoglobin tests is returned in a query result for this example temporal autocorrelation. The third factor discussed above, i.e., the time frame between values, may be specified using the "time interval" text box 412 and quantified using drop-down box 402. In this example, "time interval" text box 412 and drop-down box 402 has been used to specify a period of three weeks. When the user selects the "create" button, the time correlation condition is created and added to the list of conditions for the query builder to process.

In one embodiment, a user may choose to compose a temporal autocorrelation condition for a logical field if it has an autocorrelation date/time attribute (e.g., auto-correlate attribute 215 and units attribute 216 of logical field $208_3$ of FIG. 2B). In such a case, when the user selects to compose a correlation condition for a given logical field, the query interface 400 is displayed to the user. Of course query interface 400 provides just one example of an interface that may be used to compose a correlation condition.

FIG. 5 illustrates an example of an abstract field definition 500 for a field with temporally correlated data, according to one embodiment of the invention. In this example, the field definition 500 is composed using an XML grammar and corresponds to the logical field $208_3$ shown in FIG. 2B. Field definition 500 defines an autoCorrelation attribute of this logical field, named the "Test Time" attribute. The "autoCorrelate" attribute is set to "true," indicating that data for this logical field may be used in a temporal autocorrelation condition. An "autoCorrelationUnits" attribute specifies units of time for displayed in the query interface. In the absence of the autoCorrelationUnits indicator, the type of field referred to by the attribute would determine the units of time. For example, a "date" type would allow years, months, weeks, and days. A "timestamp" type would allow yeas, months, weeks, days, hours, minutes, seconds, milliseconds, etc. Finer granularity for time increments would be useful for machine output, such as heart and oxygen monitors.

Figure 6:
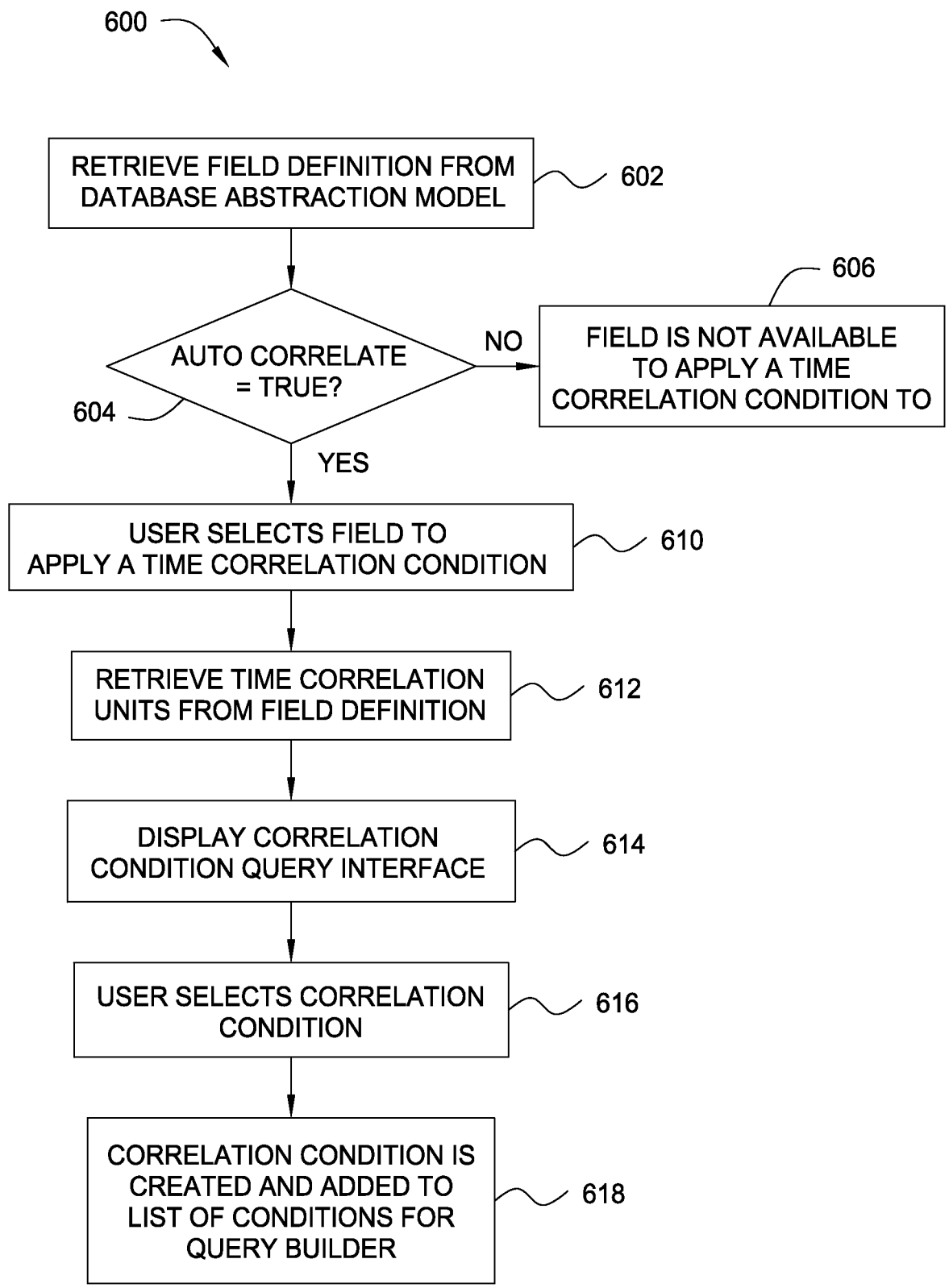
FIG. 6 is a flow diagram illustrating a method for displaying and receiving a time correlation condition, according to one embodiment of the invention.

FIG. 6 is a flow diagram illustrating a method 600 for displaying a query interface for receiving a time autocorrelation condition, according to one embodiment of the invention. In one embodiment, before a user selects a logical field to include in an abstract query, the field definition is retrieved from the database abstraction model. At step 604, if an "autoCorrelate" attribute is set to "true," then the logical field is available for the user to apply a time autocorrelation condition. If not, at step 606, the method 600 returns to step 602 where the user may add another logical field to an abstract query being composed. Returning to step 604, if the logical field is available to use in autocorrelation conditions, then the user may select to add such a condition at step 610. At step 612, the time correlation units may be retrieved from the field definition in the database abstraction model 148. For example, the units attribute 216 of logical field $208_3$ from FIG. 2B. At step 614, the correlation condition query interface may be displayed to the user, e.g., the query interface 400 of FIG. 4 with the time correlation units retrieved in step 612. At step 616, the user may interact with the query interface to specify parameters for each of the three factors discussed above in order to define a temporal autocorrelation condition for an abstract query. In one embodiment, the correlation condition is created and added to the list of conditions for the query builder.

Figure 7:
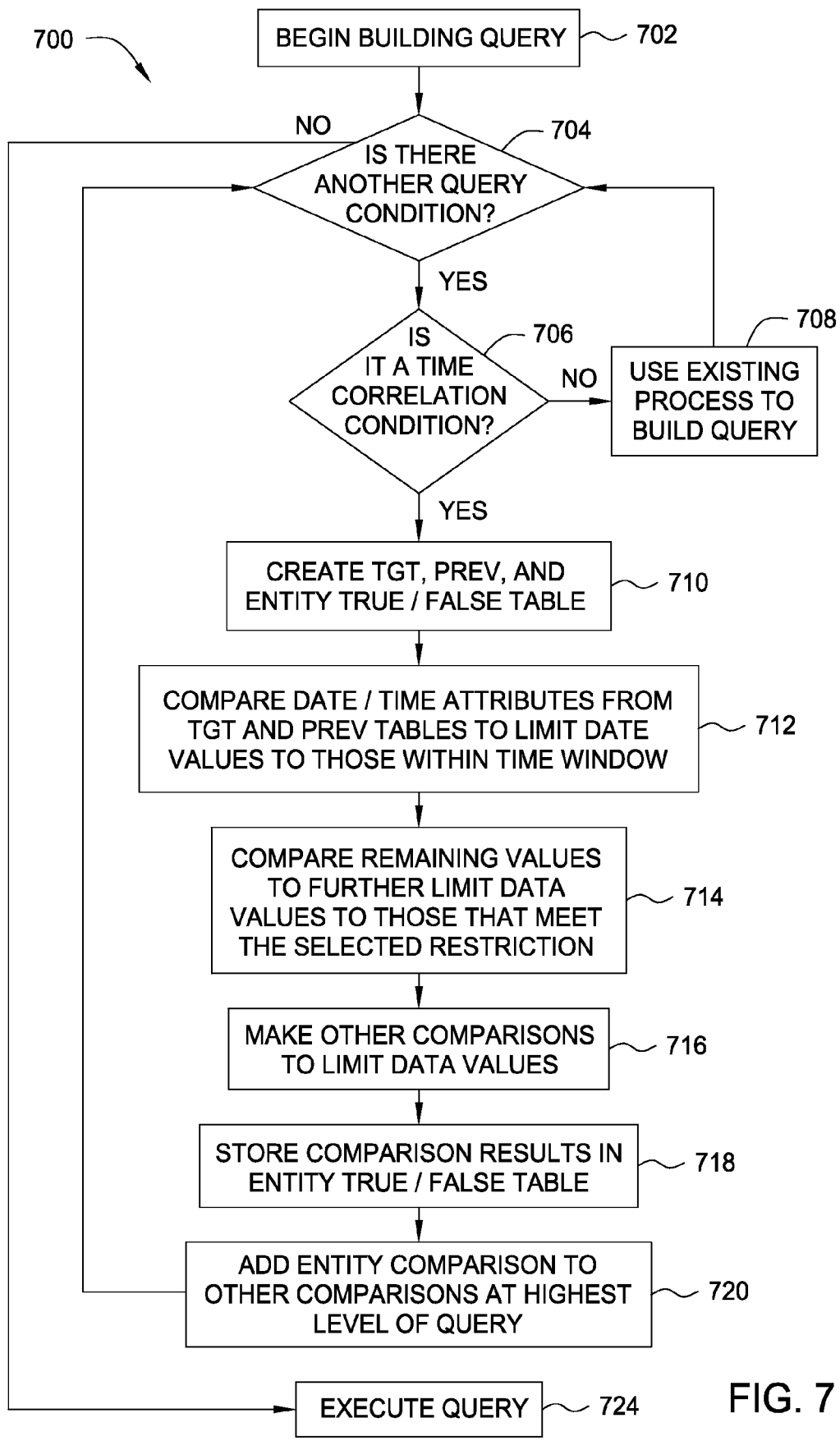
FIG. 7 is a flow diagram illustrating a method for building a resolved query for an abstract query that includes a time correlation condition, according to one embodiment of the invention.

FIG. 7 is a flow diagram illustrating a method 700 for building a resolved query (e.g., a complete SQL "SELECT" statement) for an abstract query that includes a time correlation condition, according to one embodiment of the invention. At step 702, once a user completes the process of adding query conditions to a given abstract query, the query builder may generate a resolved query from the selection conditions and results criteria specified as part of the abstract query, including building a portion of a resolved query for any temporal autocorrelation conditions included in the abstract query.

At step 704, the query builder may determine whether another condition included in the abstract query remains to be evaluated. If not, method 700 proceeds to step 724 where a complete resolved query is executed. Otherwise, at step 706, the query builder determines whether the condition currently being evaluated is a temporal autocorrelation condition. If not, then at step 708, the query builder composes a query contribution for the query based on the access method specified in the condition currently being evaluated.

Otherwise, if the condition being evaluated is a temporal autocorrelation condition, then at step 710, the query builder may generate query statements to generate one or more sub tables used to evaluate the temporal autocorrelation condition. For discussion, the tables may be named "TGT" (target) and "PREV" (previous). The TGT and PREV tables may each include data values for the logical field for which a temporal autocorrelation condition is being evaluated. Thus, in the present example, the TGT and PREV tables each include hemoglobin test results retrieved from the underlying physical database using the corresponding hemoglobin logical field. Each test value for a given patient in the TGT table may be compared to each value in the PREV table to identify whether the autocorrelation condition is satisfied for that patient.

Additionally, at step 710, the query builder may generate a true/false table (or query language to generate a table) to record whether a given instance of a model entity (e.g., a patient) satisfies the time correlation condition (e.g., a 10% change in hemoglobin levels within three weeks). That is, the true/false table may be used to record whether a patient did or did not match the overall temporal autocorrelation condition. In one embodiment, the query builder may generate SQL statements executed as a sub query embedded within a main query. The sub-queries may instantiate the TGT, PREV, and true/false tables at the time the resolved query is executed.

At step 712, query language is generate to compare date/time attributes for the data values in the TGT and PREV values in order to limit data values to those within the time window specified in the autocorrelation condition. At step 714, query language is generated to compare the values from step 712 to filter out those that meet the correlation conditions specified in the abstract query. In other words, at step 712, query language is generated to filter tests that occur too far apart to satisfy the temporal autocorrelation condition, and at step 714, query language is generated to filter tests that do not change in value by an amount specified by the temporal autocorrelation condition. This comparison may differ significantly, depending on the type of change (increasing, decreasing, or absolute change) and the units of change (percentage or specific units).

At step 716, other comparisons specified by the logical field definition may be added to the query language generated for the TGT and PREV tables. For example, the table storing hemoglobin test results may hold values for a variety of other tests. In such a case, at step 716, the query builder may generate query statements to include in the resolved query so that only values for hemoglobin tests are used to evaluate the temporal autocorrelation condition. Thus, a query predicate effectively specifying "test type=hemoglobin," may be added to the resolved query.

At step 718, query language is generated to store the results of the temporal autocorrelation condition in the true/false table generated at step 710. For example, two (or more) data values at some point within the sliding window, as identified by evaluating successive values from the TGT and PREV tables, may be determined to exhibit an anomalous change in hemoglobin levels. At step 720, any other relevant conditions may be included in the resolved query. For example, the abstract query may include a condition based on the "age" logical field and specify that only patients who are at least 16 years old should be included in the query results. If no other query conditions are added at step 720, the method 700 returns to step 704 to continue building the resolved query. Once the resolved query is complete, the query is executed 724. If there are more query conditions, then the next step is step 706. Once the query builder builds the entire query, it is executed 724.

Table I, below, illustrates an SQL query composed according to method 700 for the example temporal autocorrelation condition for identifying patients with a greater than 10% change in hemoglobin levels within a three week period.

table, the query on lines 001-005 and 031-033 selects values that satisfy the temporal autocorrelation condition.

In this example, limes 16-20 show the time correlation conditions built using database columns that represent the date/time attribute associated with the hemoglobin test. Specially, lines 016-017 restrict query results to tests that occur within 21 days of one another, and lines 17-21 restrict query results to tests that change by more than 0.1 (i.e., by 10%). Of course, the temporal autocorrelation condition may be used to specify variety of changes to evaluate test results. For example, Table II illustrates additional examples of query language that could be generated for different temporal autocorrelation conditions.

TABLE II

Examples of Autocorrelation Conditions

Value changes by 10 units or more:
   ABS (TGT.NUMERIC_VALUE – PREV.NUMERIC_VALUE) >= 10
Value increases by 10 units or more:
   (TGT.NUMERIC_VALUE – PREV.NUMERIC_VALUE) >= 10
Value decreases by 10 units or more:
   (TGT.NUMERIC_VALUE – PREV.NUMERIC_VALUE) <= –10
Value decreases by 10% or more:
   ((PREV.NUMERIC_VALUE–TGT.NUMERIC_VALUE) /
   PREV.NUMERIC_VALUE) <= –.10
Value increases by 10% or more:
   ((PREV.NUMERIC_VALUE – TGT.NUMERIC_VALUE)/
   PREV.NUMERIC_VALUE) >= .10

Lines 20-21 of Table I illustrate query language generated at step 716 of method 700. In this case, assume the condition of

TABLE I

EXAMPLE SQL QUERY

```
001 SELECT
002    "t1"."PATIENT_ID" AS "Patient ID",
003    "t2"."Hct % Bld" AS "Hct % Bld"
004 FROM
005    "DQBSAMPL"."PATIENTINFO" "t1"
006    LEFT JOIN (
007        SELECT DISTINCT
008        "TGT"."PATIENT_ID"
009     FROM
010        "DQBSAMPL"."PATIENTINFO" "t8"
011        LEFT JOIN "DQBSAMPL"."TESTRESULTS" "TGT" ON
012        "t8"."PATIENT_ID" = "TGT"."PATIENT_ID"
013        LEFT JOIN "DQBSAMPL"."TESTRESULTS" "PREV"
014        "TGT"."PATIENT_ID" = "PREV"."PATIENT_ID"
015     WHERE
016        "PREV"."TEST_DTTM" < "TGT"."TEST_DTTM" AND
017        "PREV"."TEST_DTTM" + 21 DAYS >= "TGT"."TEST_DTTM"
018        AND ABS(("PREV"."NUMERIC_VALUE" –
019        "TGT"."NUMERIC_VALUE") / "PREV"."NUMERIC_VALUE") >=
020        .10 AND "TGT"."LOINC_CODE" = '20570-8' AND
021        "PREV"."LOINC_CODE" = '20570-8'
022      ) "t6" ON "t1"."PATIENT_ID" = "T6"."PATIENT_ID"
023    LEFT JOIN (
024      SELECT
025        CAST ("t7"."NUMERIC_VALUE" AS DECIMAL(15, 3)) AS "Hct %
026        Bld", "t7"."PATIENT_ID" FROM "DQBSAMPL"."TESTRESULTS"
027        "t7"
028      WHERE
029        "t7"."LOINC_CODE" = '20570-8'
030      ) "t2" ON "t1"."PATIENT_ID" = "t2"."PATIENT_ID"
031 WHERE
032    ( "t6"."PATIENT_ID" IS NOT NULL AND t1"."AUTHORIZATION_ID1"
033    IS NULL)
```

As show, the two sub queries on lines 007-023 and 025-031 create the TGT table and PREV tables. Further, from this "LOINC_CODE"='20570-8'" is used to specify a hemoglobin test. This portion of the resolved query may be generated for an abstract query that includes a temporal autocorrelation condition for a filtered logical field. Lines 32-33 are used to test which patients did or did not match the time correlation condition specified by the abstract query.

Advantageously, embodiments provide a convenient way for users to extract anomalous autocorrelation data, without the need for spending time to write complicated queries, like the query shown in Table I. By using the data definition provided in the logical field, the query interface displays only relevant options for correlation conditions. In one embodiment, a query builder uses the correlation conditions to generate sub tables and query code for execution. The sub tables are used to evaluate a sliding window moving through time to identify data values with anomalous changes that occur in a specified time period. Thus, the present invention provides an efficient method to extract anomalous values for fields with temporal autocorrelation data, while eliminating errors associated with manually composing query code.

While the foregoing is directed to embodiments of the present invention, other and further embodiments of the invention may be devised without departing from the basic scope thereof, and the scope thereof is determined by the claims that follow.

What is claimed is:

1. A method of finding anomalous values for data from a database by using a temporal autocorrelation condition, comprising:
   receiving an abstract query composed from a plurality of logical fields, wherein a first logical field in the abstract query includes a temporal autocorrelation condition specifying:
   (i) a type of change two data values retrieved for the first logical field should exhibit to be identified as an anomalous value,
   (ii) a delta value specifying how much two data values retrieved for the first logical field should differ from one another to be identified as an anomalous value, and
   (iii) a time frame within which two data values should occur to be identified as an anomalous value;
   generating a resolved query of the database using the temporal autocorrelation condition,
   executing the resolved query to retrieve a set of query results; and
   returning query results to a user, wherein the query results include an indication of any anomalous values identified based on the temporal autocorrelation condition for the first logical field.

2. The method of claim 1, wherein generating the resolved query comprises generating a structured query language (SQL) statement configured to generate at least a target table and a previous table, wherein the data values in the target table and previous table include data values retrieved for the first logical field and are used to evaluate each pair of data values retrieved for the logical field to identify anomalous values based on the temporal autocorrelation condition.

3. The method of claim 1, wherein each logical field is associated with a logical field definition in a database abstraction model, wherein the definition provides at least an access method specifying a method for accessing data from an underlying physical database.

4. The method of claim 1, wherein the logical field definition for the first logical field further specifies that the first logical field supports temporal autocorrelation conditions and at least one time unit selectable by the user as the time frame.

5. The method of claim 1, wherein the type of change for the first logical fields is selected from at least an increase in two data values retrieved for the first logical field, a decrease in two data values retrieved for the first logical field, a percentage change between two data values, and combinations thereof.

6. The method of claim 1, wherein the resolved query includes query conditions generated for conditions in the abstract query other than the temporal autocorrelation condition.

7. The method of claim 1, wherein the user interacts with a graphical user interface specify the type of change, the delta value and the time frame.

8. A computer-readable storage medium containing a program which, when executed, performs an operation of finding anomalous values for data from a database by using a temporal autocorrelation condition, the operation comprising:
   receiving an abstract query composed from a plurality of logical fields, wherein a first logical field in the abstract query includes a temporal autocorrelation condition specifying:
   (i) a type of change two data values retrieved for the first logical field should exhibit to be identified as an anomalous value,
   (ii) a delta value specifying how much two data values retrieved for the first logical field should differ from one another to be identified as an anomalous value, and
   (iii) a time frame within which two data values should occur to be identified as an anomalous value;
   generating a resolved query of the database using the temporal autocorrelation condition,
   executing the resolved query to retrieve a set of query results; and
   returning query results to a user, wherein the query results include an indication of any anomalous values identified based on the temporal autocorrelation condition for the first logical field.

9. The computer-readable storage medium of claim 8, wherein generating the resolved query comprises generating a structured query language (SQL) statement configured to generate at least a target table and a previous table, wherein the data values in the target table and previous table include data values retrieved for the first logical field and are used to evaluate each pair of data values retrieved for the logical field to identify anomalous values based on the temporal autocorrelation condition.

10. The computer-readable storage medium of claim 8, wherein each logical field is associated with a logical field definition in a database abstraction model, wherein the definition provides at least an access method specifying a method for accessing data from an underlying physical database.

11. The computer-readable storage medium of claim 8, wherein the logical field definition for the first logical field further specifies that the first logical field supports temporal autocorrelation conditions and at least one time unit selectable by the user as the time frame.

12. The computer readable storage medium of claim 8, wherein the type of change for the first logical fields is selected from at least an increase in two data values retrieved for the first logical field, a decrease in two data values retrieved for the first logical field, a percentage change between two data values, and combinations thereof.

13. The computer-readable storage medium of claim 8, wherein the resolved query includes query conditions generated for conditions in the abstract query other than the temporal autocorrelation condition.

14. The computer-readable storage medium of claim 8, wherein the user interacts with a graphical user interface specify the type of change, the delta value and the time frame.

15. A system, comprising:
   a processor; and
   a memory containing a program, which when executed on the processor is configured to identify anomalous values for data from a database by using a temporal autocorrelation condition by performing the steps of:
   receiving an abstract query composed from a plurality of logical fields, wherein a first logical field in the abstract query includes a temporal autocorrelation condition specifying:
      (i) a type of change two data values retrieved for the first logical field should exhibit to be identified as an anomalous value,
      (ii) a delta value specifying how much two data values retrieved for the first logical field should differ from one another to be identified as an anomalous value, and
      (iii) a time frame within which two data values should occur to be identified as an anomalous value;
   generating a resolved query of the database using the temporal autocorrelation condition,
   executing the resolved query to retrieve a set of query results; and
   returning query results to a user, wherein the query results include an indication of any anomalous values identified based on the temporal autocorrelation condition for the first logical field.

16. The system of claim 15, wherein generating the resolved query comprises generating a structured query language (SQL) statement configured to generate at least a target table and a previous table, wherein the data values in the target table and previous table include data values retrieved for the first logical field and are used to evaluate each pair of data values retrieved for the logical field to identify anomalous values based on the temporal autocorrelation condition.

17. The system of claim 15, wherein each logical field is associated with a logical field definition in a database abstraction model, wherein the definition provides at least an access method specifying a method for accessing data from an underlying physical database.

18. The system of claim 15, wherein the logical field definition for the first logical field further specifies that the first logical field supports temporal autocorrelation conditions and at least one time unit selectable by the user as the time frame.

19. The system of claim 15, wherein the type of change for the first logical fields is selected from at least an increase in two data values retrieved for the first logical field, a decrease in two data values retrieved for the first logical field, a percentage change between two data values, and combinations thereof.

20. The system of claim 15, wherein the resolved query includes query conditions generated for conditions in the abstract query other than the temporal autocorrelation condition.

21. The system of claim 15, wherein the user interacts with a graphical user interface specify the type of change, the delta value and the time frame.

* * * * *